United States Patent
Xia et al.

(10) Patent No.: US 8,036,531 B2
(45) Date of Patent: Oct. 11, 2011

(54) HYBRID SWITCH FOR OPTICAL NETWORKS

(75) Inventors: Tiejun J. Xia, Richardson, TX (US); Glenn A. Wellbrock, Wylie, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 1155 days.

(21) Appl. No.: 11/610,954

(22) Filed: Dec. 14, 2006

(65) Prior Publication Data

US 2008/0144995 A1 Jun. 19, 2008

(51) Int. Cl.
*H04J 14/00* (2006.01)

(52) U.S. Cl. .................. 398/67; 398/68; 398/71; 398/72

(58) Field of Classification Search .................. 398/2, 5, 398/45, 46, 48–51, 55, 56, 57
See application file for complete search history.

(56) References Cited

U.S. PATENT DOCUMENTS

| | | | |
|---|---|---|---|
| 5,884,017 A | 3/1999 | Fee | |
| 5,930,017 A | 7/1999 | Davis | |
| 6,115,517 A | 9/2000 | Shiragaki | |
| 6,226,111 B1* | 5/2001 | Chang et al. | 398/9 |
| 6,233,072 B1* | 5/2001 | Liu et al. | 398/5 |
| 6,490,382 B1 | 12/2002 | Hill | |
| 6,606,427 B1* | 8/2003 | Graves et al. | 385/17 |
| 6,609,840 B2 | 8/2003 | Chow et al. | |
| 6,798,991 B1 | 9/2004 | Davis | |
| 6,947,668 B1* | 9/2005 | Koeppen et al. | 398/16 |
| 2003/0133712 A1* | 7/2003 | Arikawa et al. | 398/2 |
| 2004/0240485 A1* | 12/2004 | Lipski et al. | 370/537 |
| 2004/0252935 A1* | 12/2004 | Feinberg et al. | 385/16 |

FOREIGN PATENT DOCUMENTS

EP 1324630 A2 * 7/2003

* cited by examiner

*Primary Examiner* — Dalzid Singh (57) ABSTRACT

A optical switch and switching system is provided for effecting a switchover from a first optical fiber to a second optical fiber includes a first, large scale switching component and a second, small scale switching component. The first, large scale switching component is configured to establish a cross connect between the second optical fiber and the second, small scale switching component. The second, small scale switching component may then be configured to select the cross connect following establishment of the cross connect, thereby ensuring rapid switchover from the first fiber to the second fiber, regardless of the speed of the first large scale switching component.

18 Claims, 8 Drawing Sheets

HYBRID SWITCH FOR OPTICAL NETWORKS

BACKGROUND

Optical networks include various optical switches or nodes coupled through a network of optical fiber links. Optical network failures or faults may be caused by any number of events or reasons, including damaged or severed optical fibers, or equipment failure. Because optical fibers may be installed virtually anywhere, including underground, above ground or underwater, they are subject to damage through a variety of ways and phenomena. Optical fibers and optical equipment may be damaged or severed, for example, by lightning, fire, natural disasters, traffic accidents, digging, construction accidents, and the like.

Because optical fibers carry far greater amounts of information than copper wires used to transmit electrical telecommunications signals, the loss of an optical fiber can cause far more user disruptions when compared with the loss of a copper wire. For example, the loss of a single optical link, such as an optical link carrying a Wavelength Division Multiplexed ("WDM") signal, may result in the loss of hundreds of thousands of phone calls and computer data transmissions. Additionally, dozens of fibers may be routed within a single cable or conduit, substantially increasing the risk of loss associated with a damaged cable or conduit.

To reduce the negative effects of optical network failures, optical network topologies are provided in arrangements and configurations, such as mesh or ring topologies, so that telecommunications traffic may traverse the optical network using multiple optical links. This allows such optical networks to be reconfigured to route around network failure point. An optical network may include both working links or paths and spare links or paths that may be used to assist with optical network restoration. Due to the large amount of data or bandwidth an optical network carries, the amount of time it takes to identify the location of an optical network failure, and the time it takes then to reconfigure the optical network, may result in significant amounts of telecommunications traffic being lost. In particular, the reconfiguration of an optical network may result in the loss of other telecommunications traffic if not done efficiently or optimally.

Known restoration techniques and methodologies are generally designed to restore telecommunications networks operating in the electrical domain as opposed to the optical domain, which presents additional challenges. Unfortunately, switching and restoration in the electrical domain, while fast, results in a significant waste of fiber resources, in that entire optical links are removed from service, even when only a small portion of the fiber is in need of maintenance.

Another technique involves the use of a central control and database to model the network, monitor network operations, and communicate instructions to each node or optical switch in the network in response to a failure. Unfortunately, as fiber counts and network bandwidth requirements increase, the ability to efficiently switch signals in the optical domain is significantly reduced.

BRIEF DESCRIPTION OF THE DRAWINGS

The accompanying drawings, which are incorporated in and constitute a part of this specification, illustrate one or more exemplary embodiments of the invention and, together with the description, explain the invention. In the drawings.

DETAILED DESCRIPTION OF PREFERRED EMBODIMENTS

The following detailed description of implementations consistent with the present invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with aspects described herein provide a hybrid optical switch for enabling rapid switchover from a working fiber to a backup fiber in the event of required downtime or other maintenance. In one implementation, for example, a combination of a slower, large scale switch and a faster, small scale switch may be used to affect the switchover.

Exemplary Architecture

Figure 1:
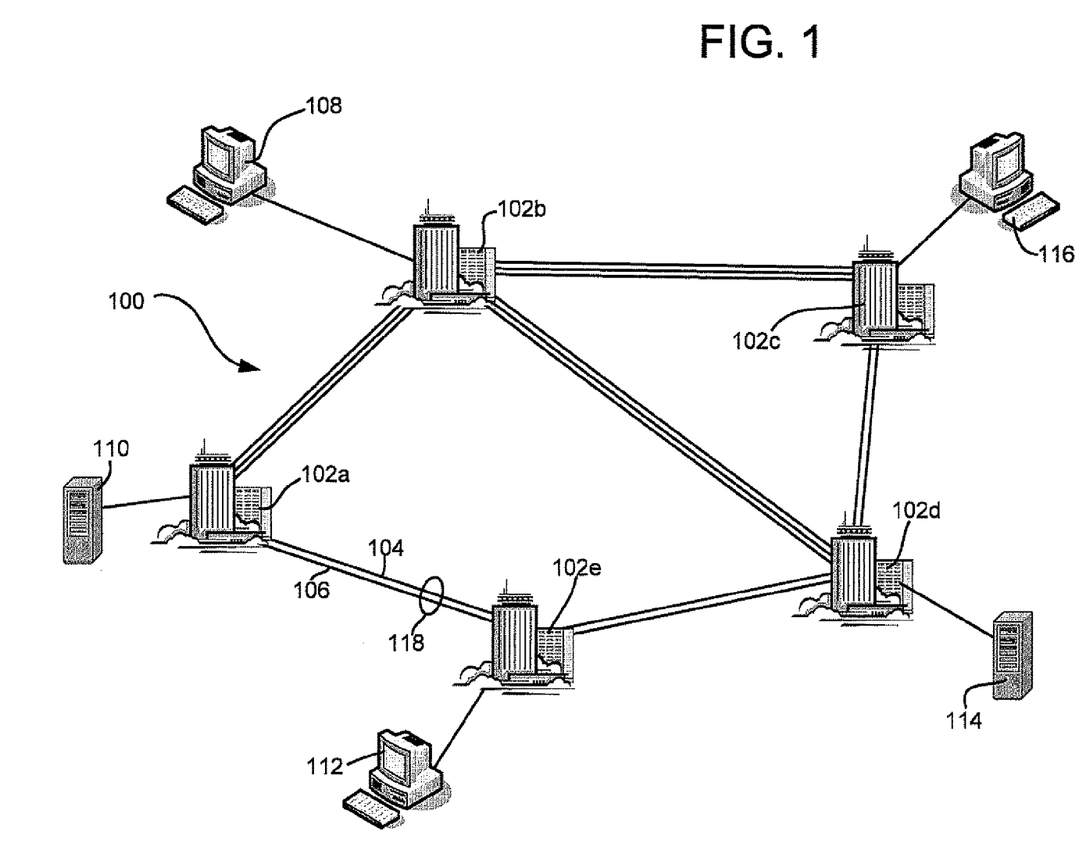
FIG. 1 is a block diagram illustrating an exemplary communications system 100 in which systems and methods consistent with the exemplary embodiments described herein may be implemented.

FIG. 1 is a block diagram illustrating an exemplary communications system 100 in which systems and methods consistent with the exemplary embodiments described herein may be implemented. Communications system 100 may include multiple sites 102a, 102b, 102c, 102d, and 102e connected together by links 104 and 106. Links 104 and 106 may be implemented using electrical cables, satellites, radio or microwave signals, or optical connections and can stretch for tens or hundreds of miles between sites. Through these links, the communications system 100 carries data signals among the sites 102a-102e to effectively interconnect data equipment 108, 110, 112, 114, and 116 (e.g., computers, remote terminals, servers, etc.) In the case of fiber optic links, each link may be configured to provide a number of high speed (e.g., 10 Gbps) connections using known WDM techniques. One or more links 104 and 106 that connect two sites are collectively referred to as a span 118.

A span 118 often includes multiple parallel links to increase working and spare capacity. As discussed above, to protect against data loss from fiber link or other equipment failures, redundant spare links may be commonly added between sites with the intent that they usually carry no data traffic but are available as alternate routes in the event of partial network failure affecting working links. If the network detects a link failure such as a fiber failure, cable cut, or transmitter/receiver nodal failure, traffic may be automatically switched from the failed link to an available spare link.

Figure 2:
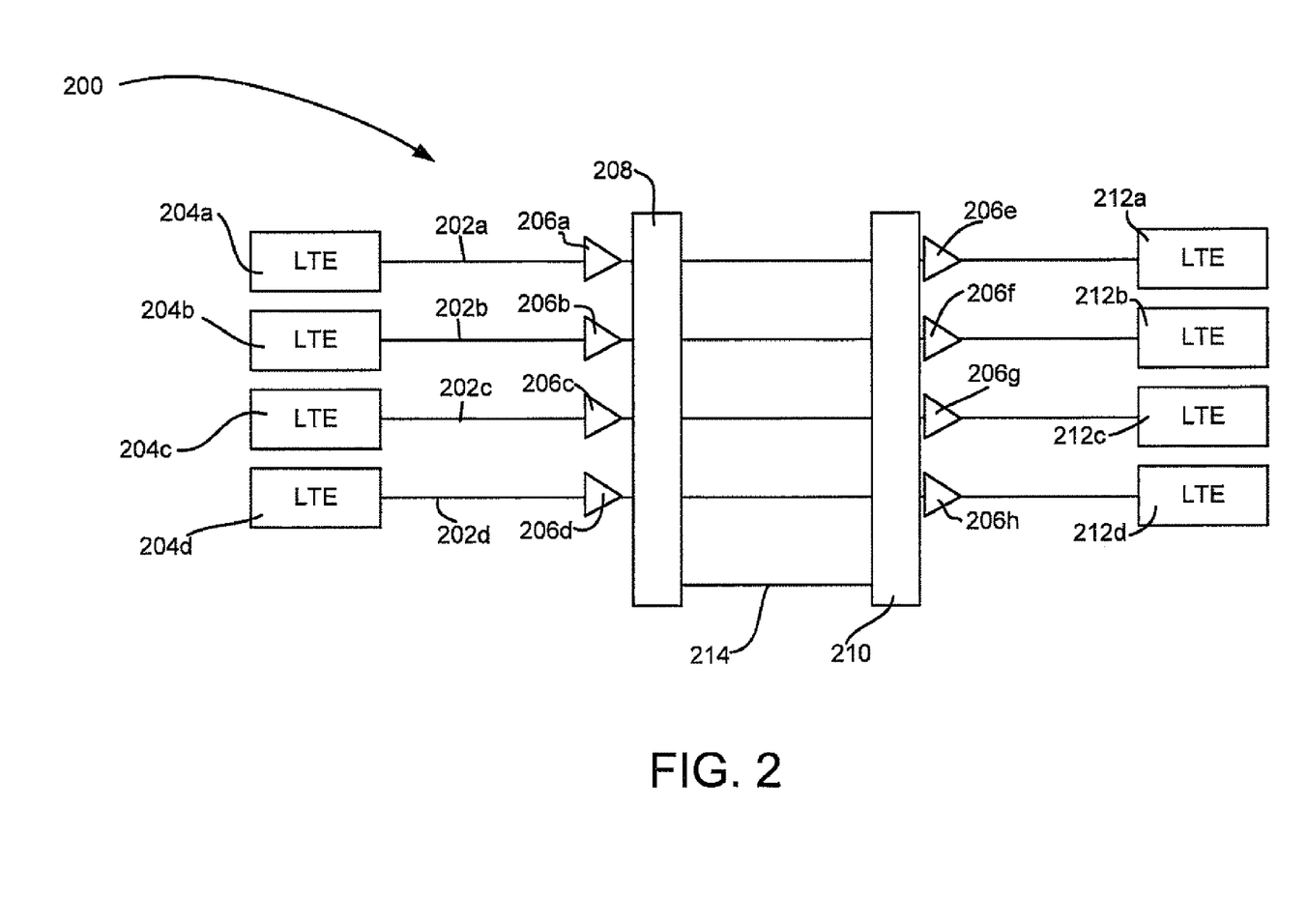
FIG. 2 is a block diagram conceptually illustrating a high data rate optical span for a fiber optic cable including a number of working fibers.

FIG. 2 is a block diagram conceptually illustrating a high data rate optical span 200 for a fiber optic cable including four working fibers 202a-202d. Span 200 may include a number of transmitting line terminal ends (LTEs) 204a-204d, a number of optical amplifiers 206a-206h, an upstream switch, a downstream switch 210, a number of receiving LTEs 212a-212d, and a backup fiber 214. In accordance with embodiments described below, fiber lengths between optical amplifiers 206 may be referred to as nodes. By incorporating upstream and downstream switches 208 and 210 for each node, traffic may be switched in the optical domain from a working fiber requiring maintenance (e.g., one of fibers 202a-202d) to backup fiber 214. Although only three working fibers 2021-202c and one backup fiber 202d are illustrated in FIG. 2, it should be understand that any suitable number of fibers may be switched in accordance with embodiments described herein.

Figure 3:
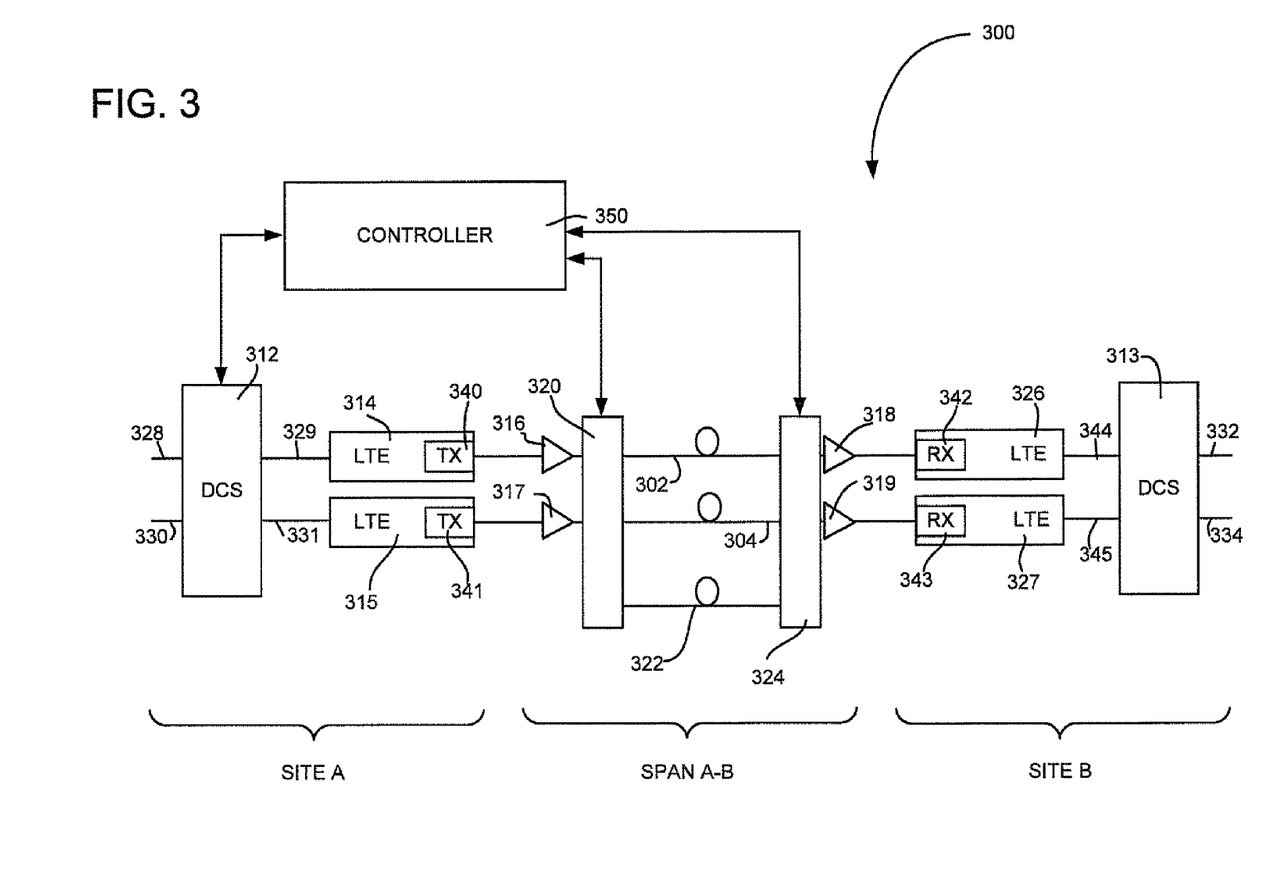
FIG. 3 illustrates one exemplary implementation of a high data rate optical span as depicted in FIG. 2.

One exemplary implementation of a high data rate optical span is depicted in FIG. 3. In FIG. 3, a given site A is connected to another site B by a span (Span A-B) consisting of two optical fibers 302 and 304. Additionally, each span may include upstream and downstream digital cross connected switches (DCSs) 312 and 313, transmitting LTEs 314 and 315, optical amplifiers 316, 317, 318, and 319, an upstream hybrid switch 320, a backup fiber 322, a downstream hybrid switch 324, receiving LTEs 326 and 327, and controller 350.

Two electrical data signals are presented at site A via inputs 328 and 330. In normal operation, these signals may be carried through the network span and recovered at Site B as electrical signal outputs 332 and 334 respectively. For example, these data signals may be STM-64 synchronous data signals each bearing digital data at about 10 Gbps or the equivalent of 128,000 telephone-quality voice channels. As mentioned briefly above, each fiber 302 and 304 may be configured to carry multiple signals using different wavelengths.

At site A, the signal presented at input 328 enters DCS 312, and under normal conditions appears as an electrical signal along connection 329. The signal at connection 329 enters LTE 314, shown to include an optical transmitter 340, such as a semiconductor laser. Light emitted by transmitter 340 may be wavelength division multiplexed by the electrical data signal that enters along connection 329 to deliver a modulated optical output signal over optical fiber 302.

As shown, fiber length 302 may include several optical amplifiers 316 and 318 for facilitating long haul lengths of optical fibers. Prior to the introduction of WDM, prior optical networks required a separate electrical regenerator every 60 to 100 kilometers. Traffic on each fiber would be converted from the optical to electrical domain and then regenerated for the next span. Conversely, optical amplifiers 316 and 318 may reamplify all of the channels on a WDM fiber in the optical domain without the need to de-multiplex, convert to the electrical domain, and individually process the included signals. In one implementation, optical amplifiers 316 and 318 may be spaced approximately every 1000 kilometers or so. Although only a pair of optical amplifiers is disclosed for each fiber 302 and 304 (i.e., optical amplifiers 316, 317, 318, and 319), it should be noted that any number of optical amplifiers may be supported to facilitate transmission of optical signals from site A to site B. In accordance with exemplary embodiments described herein, each optical amplifier may be connected to upstream and downstream hybrid switches to facilitate switchover from a working fiber to a backup fiber in the event of outage or maintenance needs.

In normal operation, each optical signal would proceed through upstream hybrid switch 320, along fiber 302, through downstream hybrid switch 324 to receiving LTE 326 located at site B. Receiving LTE 326 may include receiver 342 for receiving the optical signals from fiber 302 and outputting electrical versions thereof. In one implementation, receiver 342 may include a photodiode. In the illustrated implementation, receiver 342 is shown to be a part of receiving LTE 326 that amplifies and conditions the signal to render a faithful electrical reproduction at output 344.

Although only described above with respect to fiber 302, traffic along fiber 304 may be similarly processed, with an electrical data signal presented at input 330 being transported from DCS 312 through connection 331, through transmitting LTE 315 via transmitter 341, through optical amplifier 317, upstream hybrid switch 320, fiber 304, downstream hybrid switch 324, optical amplifier 319, receiving LTE 327 via receiver 343 to output port 345.

Under normal operation, upstream and downstream hybrid switches 320 and 324 simply connect upstream sections of fibers 302 and 304 to downstream sections of fibers 302 and 304 to complete the end-to-end connection of inputs 328 and 330 to outputs 332 and 334, respectively.

In FIG. 3, fibers 302 and 304 are referred to as working fibers because they both carry data traffic when all network elements are functioning properly. In contrast, fiber 322 may be referred to as a spare or backup fiber because it carries data traffic only in the event of failure of one of the working fibers 302 and 304 or of the associated LTEs 314, 315, 326, and 327. Under normal circumstances, backup fiber 322 does not carry an optical data signal. It should be understood that while only two working fibers 302 and 304 are disclosed in FIG. 3, this number is merely exemplary and provided for the purposes of brevity and simplicity only. Real world fiber networks may incorporate a significantly higher number of working fibers for each backup fiber, depending on network demands. Additionally, real world fiber networks may incorporate more than one backup fiber.

When maintenance is required for one of working fibers 302 and 304, hybrid switches 320 and 324 switch data traffic onto backup fiber 322. For example, if fiber 302 requires maintenance, upstream hybrid switch 320 may connect the output from optical amplifier 316 to backup fiber 322. At the same time, downstream hybrid switch 324 may connect backup fiber 322 to the input of optical amplifier 318. This switching action restores end-to-end connectivity between input 328 and output 332 during a maintenance period for working fiber 302. Details regarding the configuration of upstream and downstream hybrid switches 320 and 324 are set forth in additional detail below.

By providing high speed switching between optical amplifiers in the optical domain, rapid switchover to backup fiber 322 may be realized in the event tat a working fiber 302 or 304 needs to be taken out of service.

To successfully perform backup fiber switching, controller 350 may be configured to direct upstream hybrid switch 320 and downstream hybrid switch 324 to switch an output of optical amplifier 316 or 317 to backup fiber 322. As will be described in additional detail below, a final switchover of downstream hybrid switch 324 may be accomplished without controller direction, such that losses resulting from data "trapped" in fiber 302 or 304 at the time of switchover may be minimized, More specifically, the final switchover of downstream hybrid switch 324 may be performed in direct response to the switchover of upstream hybrid switch 320 by using light detection techniques as described below. Controller 350 may include an imbedded microprocessor, computer, workstation, or other type of processor for controlling the switching of upstream hybrid switch 320.

Figure 4A:
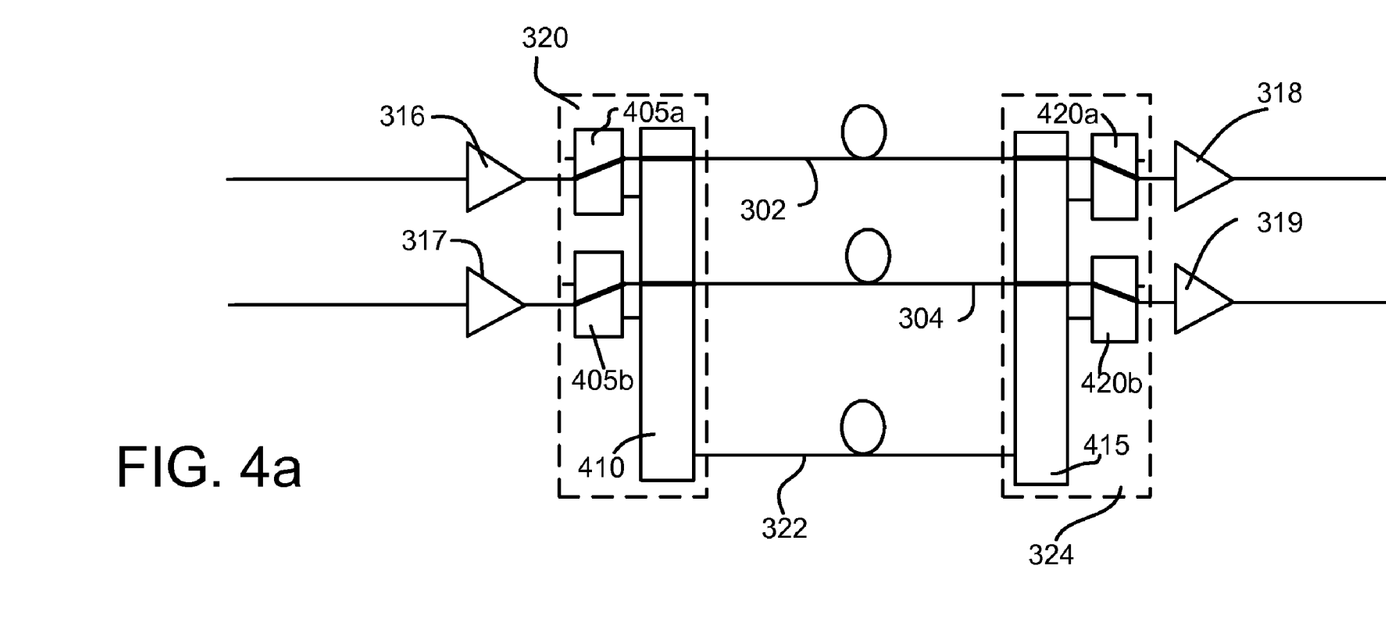
FIG. 4a-4c are exemplary block diagrams illustrating a fiber node configured to include hybrid switching components.
Figure 4B:
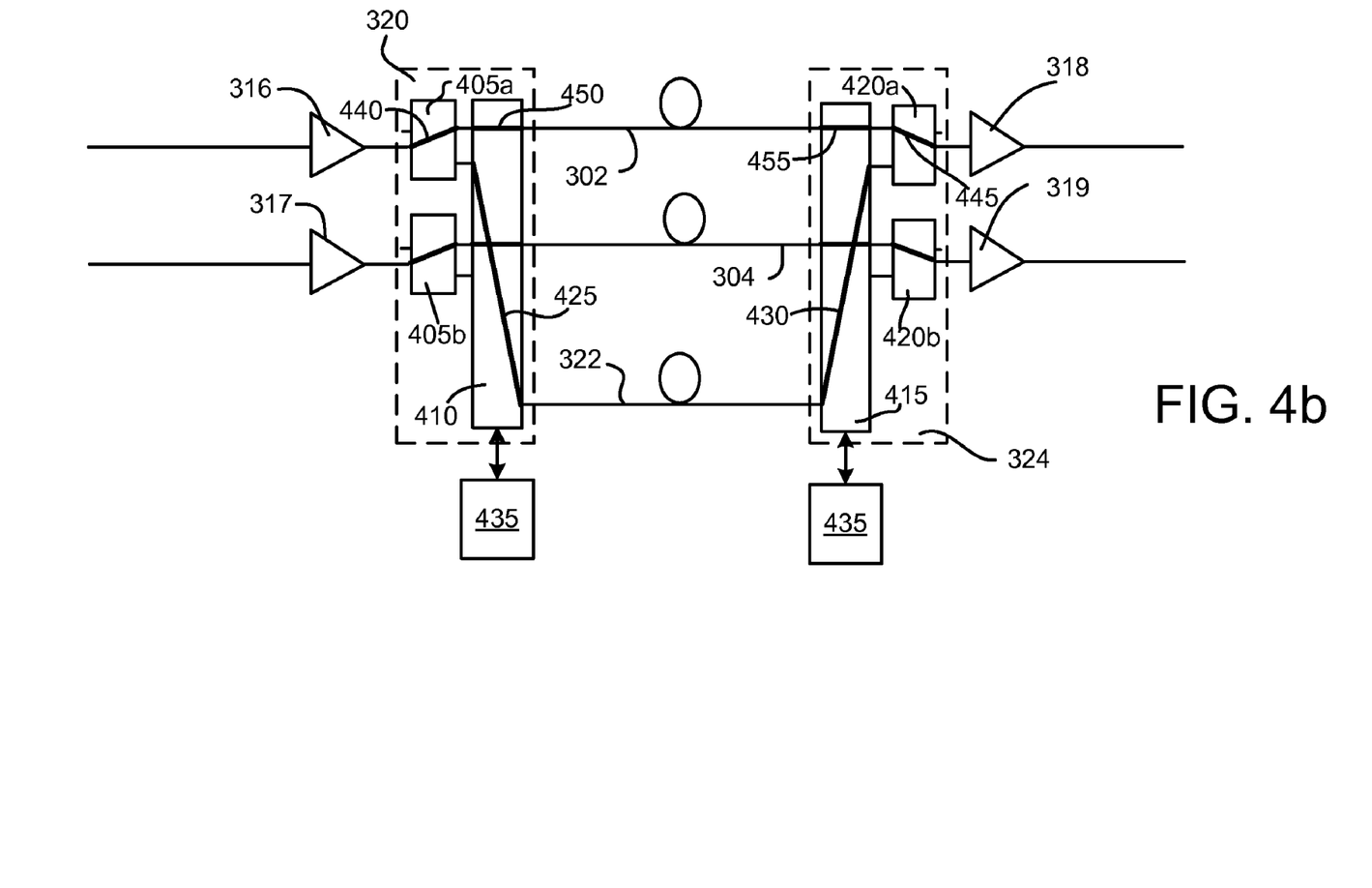
Figure 4C:
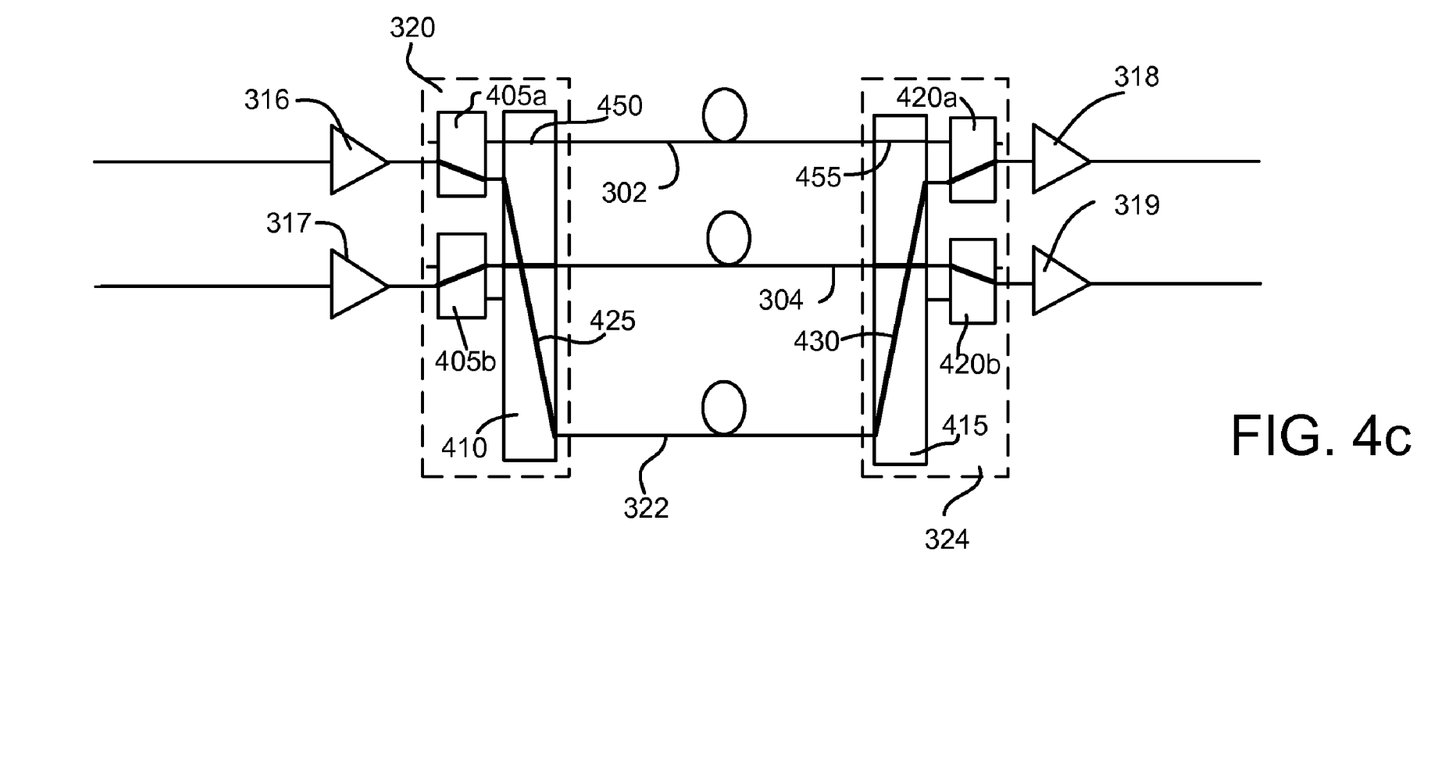

FIGS. 4a-4c are a block diagram illustrating a node of fibers 302 and 304 positioned between optical amplifiers 316 and 318 and 317 and 319, respectively, in various stages of switchover. As illustrated in FIG. 4a, upstream hybrid switch 320 may include two small scale switching components 405a and 405b associated with working fibers 302 and 304, respectively. Upstream hybrid switch 320 may also include a large scale switching component 410 positioned downstream of small scale switching components 405a and 405b. Similarly, downstream hybrid switch 324 may include a large scale switching component 415 and small scale switching components 420a and 420b.

In one implementation, small scale switching components 405a may include a fast switch configured to switch an output from optical amplifier 316 between one of two inputs to large scale switching component 410. In one exemplary implementation, small scale switching components 405a-405b and 420a-420b may include a 2×2 optical switch capable of switching outputs in approximately 20 microseconds Large scale switching component 410 may include an N×N switch capable of switching a large number of input signals between a large number of output ports, where N may be a number between 10 and 1000. In one exemplary embodiment, large scale switching components 410 and 415 may include 320×320 optical switches capable of switching inputs in approximately 20 milliseconds. As shown, large scale switching component 410 may output to working fibers 302 and 304 or backup fiber 322.

By nature, large scale switching component 410 accomplishes its switching functions significantly more slowly than small scale switching components 405a and 405b. Because of this factor, using a large scale switching component alone to effect a switchover between one of working fibers 302 and 304 and backup fiber 322 would result in unacceptable loss of data. At the same time, performing backup using only small scale switches would result in the deployment and construction of hundreds or thousands of backup fibers in the optical network, since each working fiber would need to be associated with a backup fiber on a 1 to 1 or perhaps 2 to 1 basis. Neither of these alternatives is tenable to a successful optical network configuration.

Unlike either of these approaches, the described hybrid switching pair 320 and 324 enable fast switchover to backup fibers without requiring deployment of large number of backup fibers. As shown in FIG. 4b, upon receipt of a command from controller 350 (not shown) to switch over working fiber 302 to backup fiber 322, large scale switching component 410 may set up an optical cross connect 425 between a second output from small scale switching component 405a associated with fiber 302.

Following configuration of large scale switching component 410, backup fiber 322 may be configured to receive an output from small scale switching device 405a. Similarly, downstream large scale switching component 415 may be configured to set up an optical cross connect 430 between backup fiber 322 and a second output associated with small scale switching component 420a. In one exemplary implementation, successful configuration of cross connects 425 and 430 may be monitored by testing devices 435 to ensure that signals will be properly routed following switchover.

During the configuration of cross connects 425 and 430 within upstream and downstream large scale switching components 410 and 415, respectively, working fiber 302 may continue to transmit data via previously established cross connect 440 in small scale switching component 405a and cross connect 445 in small scale switching component 420a as well as cross connect 450 in large scale switching component 410 and cross connect 455 in large scale switching component 415.

Once configuration of cross connects 425 and 430 have been established, switchover from working fiber 302 to backup fiber 322 may be performed. As shown in FIG. 4c, switchover between fiber 302 and backup fiber 322 may be effected by switching small scale switching component 405a between a first output associated with working fiber 302 and a second output associated with cross connect 425. Because cross connect 425 has been previously established, switching of small scale switching component 405 enables the output from optical amplifier 316 to reach backup fiber 322.

On the downstream side, small scale switching component 420b may be triggered in a variety of manners. In one implementation, controller 350 (not shown) may trigger the switching of small scale switching component 420b. However, because light "data" present in fiber 302 at the time small scale switching component 405a is triggered should be received by optical amplifier 318 prior to switchover of small scale switching component 420b, controller 350 may need to account for a transmission delay related to the length of fiber node between optical amplifiers 316 and 318 as well as other factors.

Figure 5A:
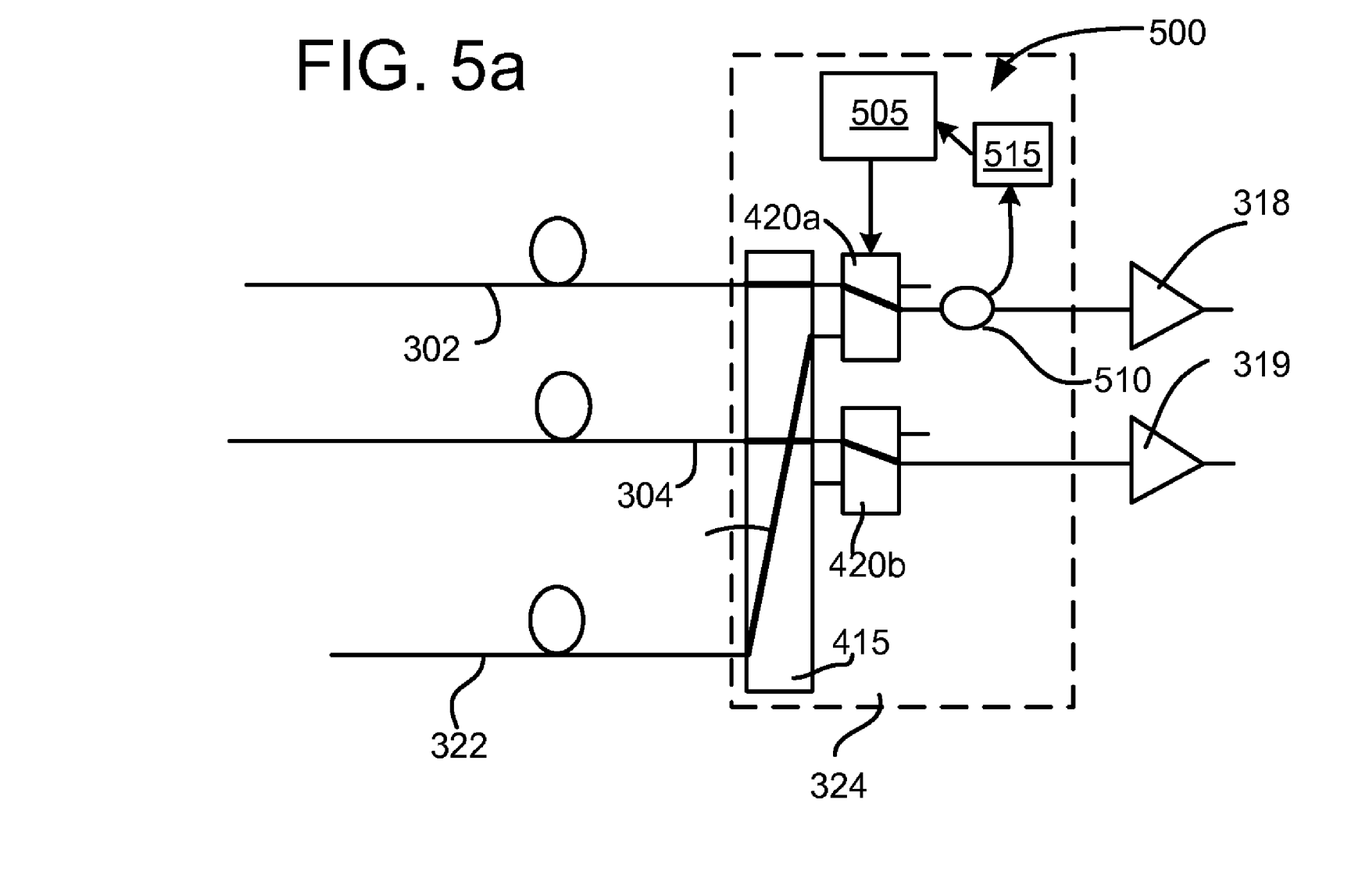
FIGS. 5a and 5b are block diagrams illustrating exemplary embodiments of traveling wave triggers for triggering switchover of the hybrid switch of FIGS. 3 and 4.

In another implementation, traveling wave synchronization may be used to trigger small scale switching component 420a. FIG. 5a is a block diagram illustrating one exemplary embodiment of a traveling wave trigger 500 for triggering switchover of small scale switching component 420a from a first input to a second input. As shown, trigger 500 may include a switch control 505, an optical tap 510 and a photo detector 515.

In operation, optical tap 510 may be configured to connect the output of small scale switching component 420a to photo detector 515 via optical tap 510. Once small scale switching component 405a has affected a switchover at the upstream end of fiber 302, light transmitted in fiber 302 will cease. Photo detector 515 may monitor the output of small scale switching component 420a to determine when this has occurred. In one implementation, photo detector 515 may include a photodiode. Once photo detector 515 observes a loss of light, a signal indicative thereof may be sent to switch control 505. Switch control 505 may then, in turn, effect the switchover of small scale switching component 420a from the first input associated with working fiber 302 to a second input associated with backup fiber 322.

Figure 5B:
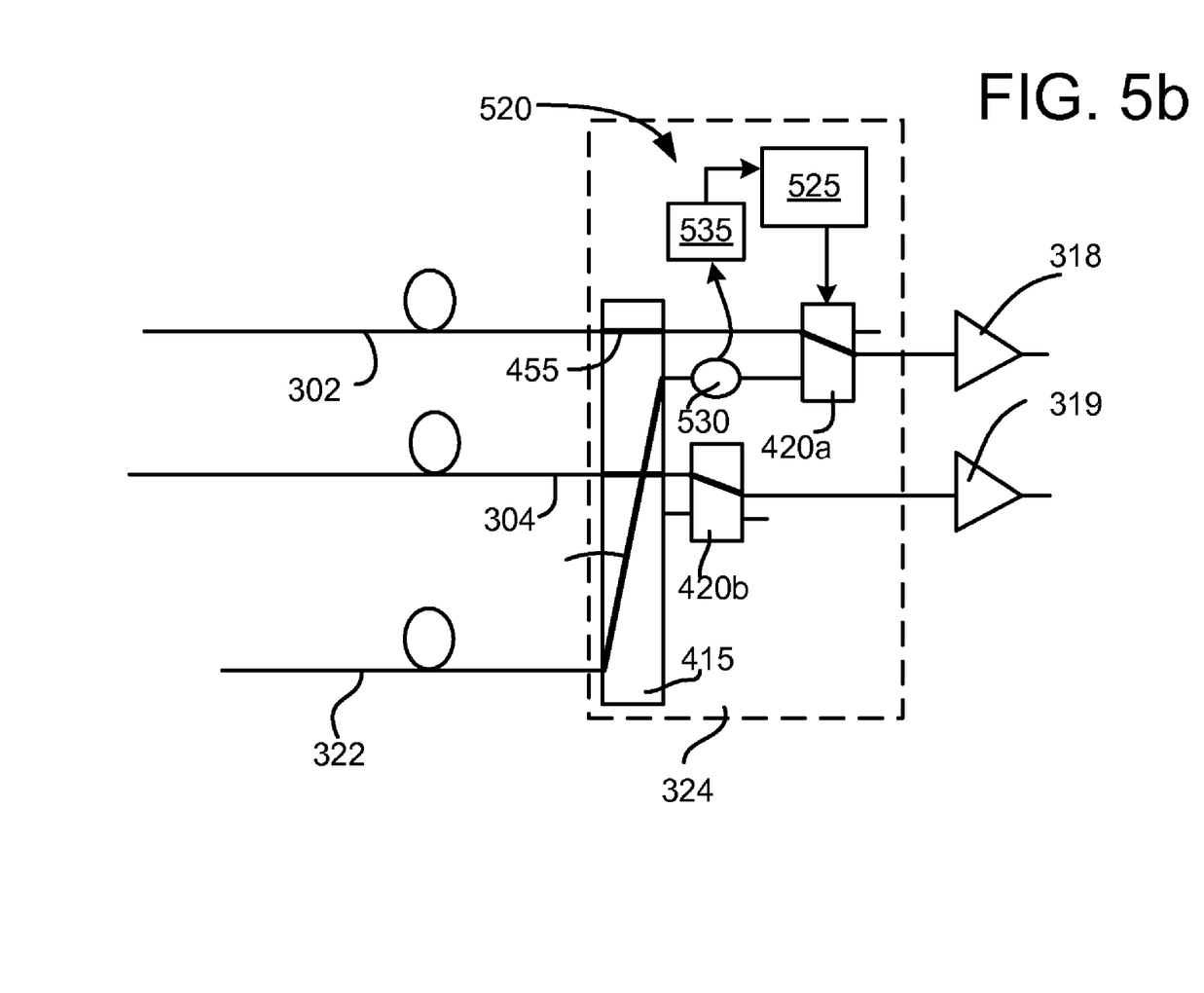

In yet another implementation, a reverse principle of traveling wave synchronization may be used to trigger small scale switching component 420a. FIG. 5b is a block diagram illustrating another exemplary embodiment of a traveling wave trigger 520 for triggering switchover of small scale switching component 420a from a first input to a second input. As shown, trigger 520 may include a switch control 525, an optical tap 530 and a photo detector 535. However, instead of positioning tap downstream of small stream switching component 420a, tap 530 may be positioned downstream of large scale switching component 415 and upstream of small scale switching component 420a.

Once small scale switching component 405a has affected a switchover at the upstream end of fiber 302 onto backup fiber 322, light transmitted in fiber 322 will begin. Photo detector 535 may monitor the output of large scale switching component 415 associated with backup fiber 322 via tap 530 to determine when light is present on backup fiber 322. Once photo detector 535 observes the presence of light at this output, a signal indicative thereof may be sent to switch control 525. Switch control 525 may then, in turn, effect the switchover of small scale switching component 420a from the first input associated with working fiber 302 to a second input associated with backup fiber 322.

By using the absence of light in working fiber 302 or the presence of light in backup fiber 322, triggers 505 and 520 may perform switching of small scale switching component 420a with minimal delay and zero loss in data previously transmitted on working fiber 302. More specifically, along with the eliminated loss of previously transmitted data, switchover from working fiber 302 to backup fiber 322 may be accomplished in an amount of time consistent with the switching times of small scale switching components 405a (T1)+ small scale switching component 420a (T2)+ processing of switch control 505 or 525 (Tp).

CONCLUSION

Implementations consistent with aspects described herein enable rapid and efficient switchover from a working fiber to a backup fiber. More particularly, in one implementation, a combination of slower, large scale optical switches, and faster, small scale optical switches may be used to implement the switchover. Moreover, traveling wave synchronization techniques may be used to reduce switch delay and data loss.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention.

It will be apparent to one of ordinary skill in the art that features of the invention, as described above, may be implemented in many different forms of hardware, software, or firmware in the implementations illustrated in the figures. The actual hardware or control software used to implement the described features is not limiting of the invention. Thus, the operation and behavior of these features were described without reference to specific hardware or control software—it being understood that one of ordinary skill in the art would be able to design hardware and software to implement the aspects based on the description herein.

Further, certain portions of the invention may be implemented as "logic" that performs one or more functions. This logic may include hardware, such as an application specific integrated circuit or field programmable gate array, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed is:

1. An optical switch for effecting a switchover from a first optical fiber to a second optical fiber, comprising:
    a first switching component for switching signals in an optical domain,
    wherein the first switching component includes a first output associated with the first optical fiber and a second output associated with the second optical fiber,
    wherein the first switching component further includes a first input and a second input, the first input connected to the first output via a first cross connect; and
    a second switching component for switching signals in the optical domain,
    wherein the second switching component includes a first output associated with the first input of the first switching component and a second output associated with the second input of the first switching component,
    wherein the first switching component is configured to establish a second cross connect between the second output associated with the second optical fiber and the second input of the first switching component, and
    wherein the second switching component is configured to switch from the first output associated with the first input of the first switching component to the second output associated with the second input of the first switching component following establishment of the second cross connect.

2. The optical switch of claim 1, wherein the first switching component comprises a large scale switching component and the second switching component comprises a small scale switching component.

3. The optical switch of claim 2, wherein the second switching component comprises a 2×2 optical switch.

4. The optical switch of claim 2, wherein the first switching component comprises an N×N optical switch where N comprises an integer between 10 and 1000.

5. The optical switch of claim 4, wherein the first switching component is a 320×320 optical switch having 320 input ports and 320 output ports.

6. The optical switch of claim 1, wherein the first optical fiber comprises a working fiber and wherein the second optical fiber comprises a backup fiber.

7. An optical switching system, comprising:
    a first upstream switching device for switching signals in an optical domain, the first upstream switching device having a first output associated with an upstream end of a first fiber;
    a second upstream switching device for switching signals in the optical domain, the second upstream switching device having a first output operatively connected to an upstream end of the first fiber, and a second output operatively connected to an upstream end of a second fiber; and
    a controller configured to establish a first cross connect in the second upstream switching device between a second output of the first upstream switching device and the upstream end of the second fiber in the event of a disruption in the first fiber,
    wherein the controller is further configured to switch the first upstream switching device from the first output to the second output following establishment of the first cross connect in the second upstream switching device.

8. The optical switching system of claim 7, wherein the first fiber comprises a working fiber, and the second fiber comprises a backup fiber.

9. The optical switching system of claim 7, wherein the first upstream switching device operates more quickly than the second upstream switching device.

10. The optical switching system of claim 7, further comprising:
    a first downstream switching device; and
    a second downstream switching device having a first input associated with a downstream end of the first fiber,
    wherein the controller is configured to establish a second cross connect in the first downstream switching device between a downstream end of the second fiber and a second input of the second downstream switching device, and
    wherein the second downstream switching device is configured to switch from the first input to the second input upon establishment of the second cross connect in the first downstream switching device.

11. The optical switching system of claim 10, further comprising:
an optical trigger associated with the second downstream switching device,
the optical trigger configured to switch the first input to the second input.

12. The optical switching system of claim 11, wherein the optical trigger comprises:
a photo detector operatively coupled to an output of the second downstream switching device,
the photo detector configured to identify a loss of light at the output of the second downstream switching device; and
a switch control configured to switch the first input to the second input when the photo detector identifies the loss of light.

13. The optical switching system of claim 11, wherein the optical trigger comprises:
a photo detector operatively coupled to the second cross connect,
the photo detector configured to identify a presence of light from the second cross connect; and
a switch control configured to switch the first input to the second input when the photo detector identifies the presence of light.

14. The optical switching system of claim 7, wherein the first upstream switching device is positioned downstream of an optical amplifier associated with the first fiber.

15. A method, comprising:
transmitting data in an optical domain from an input of a small scale switching component through a first output associated with a working fiber;
transmitting data in an optical domain from a first input of a large scale switching component corresponding to the first output of the small scale switching component through a first output of the large scale switching component associated with the working fiber;
establishing an optical cross connect in the large scale switching component between a second output of the small scale switching component and a second output of the large scale switching component associated with a backup fiber in the event of a disruption in the working fiber;
switching the small scale switching component in the optical domain from the first output to the second output after establishment of the optical cross connect; and
transmitting the data in the optical domain from the input of the small scale switching component to the second output of the small scale switching component associated with the optical cross connect.

16. The method of claim 15, further comprising:
confirming the establishment of the cross connect prior to switching the small scale switching component from the first output to the second output.

17. The method of claim 15, wherein the large scale switching component comprises a N×N optical switch, wherein N is at least 10.

18. An optical switching device, comprising:
means for transmitting optical data from an input of a small scale switching component through a first output associated with a working fiber;
means for transmitting data in an optical domain from a first input of a large scale switching component corresponding to the first output of the small scale switching component through a first output of the large scale switching component associated with the working fiber;
means for establishing a cross connect in the large scale switching component between a second output of the small scale switching component and a second output of the large scale switching component associated with a backup fiber in the event of a disruption in the working fiber;
means for switching the small scale switching component from the first output to the second output after establishment of the cross connect; and
means for transmitting the optical data from the input of the small scale switching component to the second output of the small scale switching component associated with the cross connect.

* * * * *